United States Patent [19]

Goto et al.

[11] Patent Number: 5,321,203
[45] Date of Patent: Jun. 14, 1994

[54] WIRING STRUCTURE FOR INTERIOR UNITS

[75] Inventors: Fumiya Goto, Akashi; Yoichiro Araki, Kobe, both of Japan

[73] Assignee: Kawasaki Jukogyo Kabushiki Kaisha, Kobe, Japan

[21] Appl. No.: 761,139

[22] Filed: Sep. 17, 1991

[30] Foreign Application Priority Data

Sep. 20, 1990 [JP] Japan .................. 2-98112[U]

[51] Int. Cl.⁵ .................. H02G 3/06; H01R 31/08
[52] U.S. Cl. .................. 174/48; 439/216; 439/511
[58] Field of Search .................. 174/48, 50, 52.1; 439/209, 213, 215, 216, 502, 507, 511

[56] References Cited

U.S. PATENT DOCUMENTS

| | | | |
|---|---|---|---|
| 2,175,147 | 5/1934 | Davison | 439/216 X |
| 2,284,837 | 6/1942 | O'Brien | 439/216 X |
| 3,630,406 | 12/1971 | Hammes | 174/48 X |
| 4,056,297 | 11/1977 | Gartung | 439/215 X |
| 4,367,370 | 1/1983 | Wilson et al. | 439/215 X |
| 5,186,640 | 2/1993 | McCoy | 439/215 X |

*Primary Examiner*—Timothy V. Eley
*Assistant Examiner*—Khan V. Nguyen
*Attorney, Agent, or Firm*—Schwartz & Weinrieb

[57] ABSTRACT

The present invention comprises several different embodiments of wiring systems for connecting terminal end portions of electrical wires. In accordance with a first embodiment, two terminal end portions of the wires are disposed adjacent to each other, one being fixed and one being movable, and an aperture is formed within a support panel to which the wires are secured. A pivotable lid or cover uncovers or closes the aperture so as to provide access to the terminal ends of the wires, and to close the aperture once connection of the wires has been achieved. In accordance with a second embodiment, the lid or cover is slidable upon the support panel and is connected to the movable wire such that upon slidable movement of the lid or cover, the movable wire is moved so as to connect with or be disconnected from the other wire. In accordance with a third embodiment, the lid or cover has short-circuiting wiring disposed thereon such that upon insertion of the lid or cover within the aperture of the support panel, the short-circuiting wiring and connectors of the lid or cover interconnect the two wires mounted upon the support panel. In accordance with a fourth embodiment, short-circuiting wiring and connectors are mounted upon a base, and the wires and connectors thereof are mounted upon the support panel. When the support panel is secured to the base by threaded fasteners, the connectors of the support panel wires are interconnected with the short-circuiting connectors and wires of the base.

12 Claims, 5 Drawing Sheets

WIRING STRUCTURE FOR INTERIOR UNITS

BACKGROUND OF THE INVENTION

1. Field of the Invention

The present invention relates to a simplification of wiring structure for various electric devices disposed within interior members to be mounted in a vehicle, in a building and the like, wherein the interior members to be installed therein are divided and unified.

2. Description of the Prior Art

In case, for example, of achieving unification of interior members installed in a railway vehicle, a conventionally disclosed manner of unification is performed in such a manner that only each one of the panel surfaces to be mounted on the ceiling, longitudinal-side walls and lateral-side walls within the vehicle is unified to be a unit, wherein wiring structure for the electric devices installed therein is, as conventionally done, constructed by taking advantage of tubes, cable ducts, cable supporters, and the like, which are mounted in advance in the vehicle body.

Accordingly, the construction described above provides a very narrow working space and poor working conditions to service personnel especially in connection with wiring operations to be performed beneath the floor of the railway vehicle where the service personnel has to work looking upward the whole time, and therefore, a substantially long time is required for completing the wiring operation.

In order to solve this problem, there has been disclosed a new technology in Japanese Patent Laid-Open No. 2-6265. However, the method disclosed therein is targeted only for facilitating wiring operations beneath the floor, so that although working conditions are facilitated thereby, the wiring operation itself in a working place can not be abbreviated at all.

For this reason, there has been disclosed another method as shown in FIG. 5 wherein the interior members to be installed are divided and unified as the respective ceiling units 1 and 2, a panel unit 3 and so on, which are thereafter connected to each other directly or by way of an adjusting member 4 disposed for absorbing errors in measurement, wherein each of the units is provided in advance with various electric devices, such as a fan 5, and a fluorescent lamp 6, and also with necessary electric wires 7 and 8, so that when the respective units 1 and 2 are installed on the railway vehicle, the electric wires 8 and 8' of the respective units are connected through the connectors 9 and 9' which are respectively disposed at the connection terminals of the electric wires of the respective units.

In this case, however, the connection between the connectors 9 and 9' of the respective units 1 and 2 is performed at the ceiling side, or in other words, at the back surface of the units, which can cause such problems regarding the connecting method therebetween as follows.

For example, if a method in which wires 8 and 8' are provided so as to be intentionally longer so as to previously connect the connectors 9 and 9' is adopted, the slackened wires and the connectors are vibrated during the time the vehicle is running, which can be a cause of noise, and also can be a cause of destruction of the connectors. On the other hand, if the wires are shorter than necessary, then the connecting operation can be rather difficult.

OBJECT OF THE PRESENT INVENTION

The present invention is provided for eliminating the forgoing problems, and it is an object of the present invention to provide a wiring structure which can be easily constructed in the vehicle body in a substantially short period of time.

SUMMARY OF THE INVENTION

In order to attain the above objects, the present invention provides a construction adopted for an interior structure in which interior members are suitably divided and unified to produce a plurality of interior units which are thereafter connected to each other, wherein the construction is composed by installing electric devices as incidental equipment in each of the units, supportably providing electric wires necessary for the electric devices on the back surface of the each unit, forming an aperture in the nearby region of joint portions of the respective units, disposing connectors at respective wire ends in such a manner that the connectors are facing and engageable with each other at the aperture, and disposing a lid portion for closing the aperture.

The above structure can be modified such that one of the connectors at the end portions of the respective electric wires is a fixed connector facing the aperture, and the other one of the connectors is a movable connector which is engageable with the fixed connector, and in addition, the electric wire connected to the movable connector has a length which is as short as the minimum length which is just required for engaging the movable connector with the fixed connector, or can be modified such that the movable connector is attached to the lid portion, and the lid portion is disposed with respect to the aperture in such a manner as to be slidable in the direction in which the connector is to be engaged, or modified such that the connectors are disposed at the end portions of the respective electric wires of the respective units such that their respective engaging faces are facing the aperture, and short-circuiting connectors are further provided upon the lid portion for closing the aperture so as to be electrically connected when the lid portion is closed.

The above construction can alternatively be modified as a whole in such a manner that it is constructed by installing electric devices as incidental equipment in each of the units, supportingly providing electric wires necessary for the electric devices on the back surface of the each unit, disposing connectors in the region adjacent to the joint portions of the respective units so as to be connected at the end portions of the respective electric wires, firmly mounting short-circuiting connectors on a mounting base in such a manner that the short-circuiting connectors are electrically connected therebetween and are engageable with the respective adjacent connectors, engaging the short-circuiting connectors with the connectors disposed at the end portions of the respective electric wires by way of screw means, the screw means also functioning as means for fixing the joint portions and their connectors to the mounting base.

In operation, the interior members are divided into a plurality of units of a suitable size, and when forming these individual units, installation of electric devices and necessary wires are fixedly mounted on the rear surface of the respective units, and the connectors are disposed at the respective wire ends. Thereafter, the connectors disposed at the respective wire ends are engageably connected within the vicinity of the aperture formed at the junction regions of the respective adjacent units, and the aperture is closed by a lid portion.

BRIEF DESCRIPTION OF THE DRAWINGS

The above and other objects, features and advantages of the present invention will become more apparent from the following description taken in conjunction with the accompanying drawings, in which like reference characters designate like or corresponding parts throughout the several views, and wherein:

FIGS. 2A, 2B and 2C represent a second embodiment according to the present invention, wherein FIG. 2A is a perspective view observed from an inner-room side, FIG. 2B is a perspective view observed from a mounting base side, and FIG. 2C is a sectional view observed along the line 2c-2c shown in FIG. 2A;

FIGS. 3A, 3B and 3C represent a third embodiment of the present invention, wherein FIG. 3A is a perspective view observed from an inner-room side, FIG. 3B is a perspective view with a lid portion thereof removed, and FIG. 3C is a sectional view observed along the line 3c-3c shown in FIG. 3B;

FIGS. 4A and 4B represent a fourth embodiment of the present invention, wherein FIG. 4A is a perspective view observed from an inner-room side, FIG. 4B is a perspective view observed from a mounting base side.

DETAILED DESCRIPTION OF THE ILLUSTRATED EMBODIMENTS

In the following, embodiments of the present invention which are applied within a railway vehicle are described with reference to the drawings.

Figure 1:
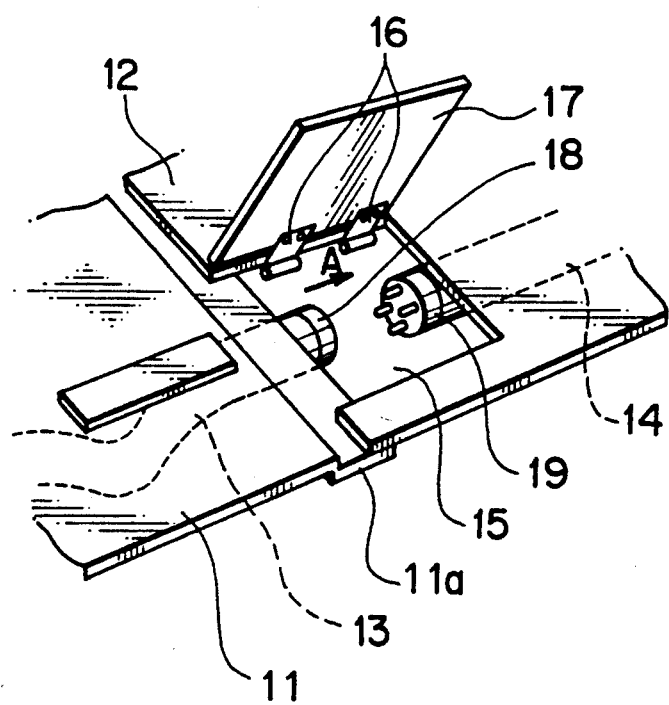
FIG. 1 is a perspective view showing an important portion of the wiring structure for interior units according to the present invention.

FIG. 1 shows a first embodiment of the present invention, wherein reference numerals 11 and 12 respectively denote interior units such as ceiling units and the like in which electric devices (not shown) are installed and electric wires which are required for these electric devices are disposed in a form of bundles as wire bundles 13 and 14. These installations of the electric devices and distribution of the electric wires can be performed when manufacturing these units, whereby these operations are substantially facilitated, and further a plurality of units can be mounted at the same time.

Here, the unit 11 is provided with a down-step portion 11a at one end thereof for receiving an end portion of the other unit 12, whereas the end portion of the unit 12 is formed with an aperture 15 having a lid portion 17 connected thereto by way of hinges 16.

Reference numeral 18 denotes a movable connector which is connected to the end portion of the wire bundle 13, but not fixed to any other place. Reference numeral 19 denotes a fixed connector which is connected to the end portion of the wire bundle 14 and is disposed within the vicinity of the aperture 15 of the unit 12. Further, the location of the movable connector 18 can be shifted to the maximum redundant length of the wire bundle 13 in the direction indicated by an arrow A, so that it can be engaged with the fixed connector 19.

In the above structure, when the lid portion 17 is opened after the units 11 and 12 are installed on a mounting base of the vehicle body (not shown), the movable connector 18 can be easily engaged with the fixed connector 19, and its engaging operation is finished when the lid portion 17 is closed. The slackness of the wire bundle 13 is determined to be as short as the minimum length just required for engagement of the connectors, and since the connectors after engagement are disposed in a fixed state, problems such as vibrating phenomena during the time that the vehicle is running will no longer occur.

By the way, although the lid portion 17 is normally closed by a fixing means, it can alternatively be closed by way of a spring applied to the respective hinges 16, so that the closed state thereof is maintained because of the biasing force of these hinges.

Figure 2A:
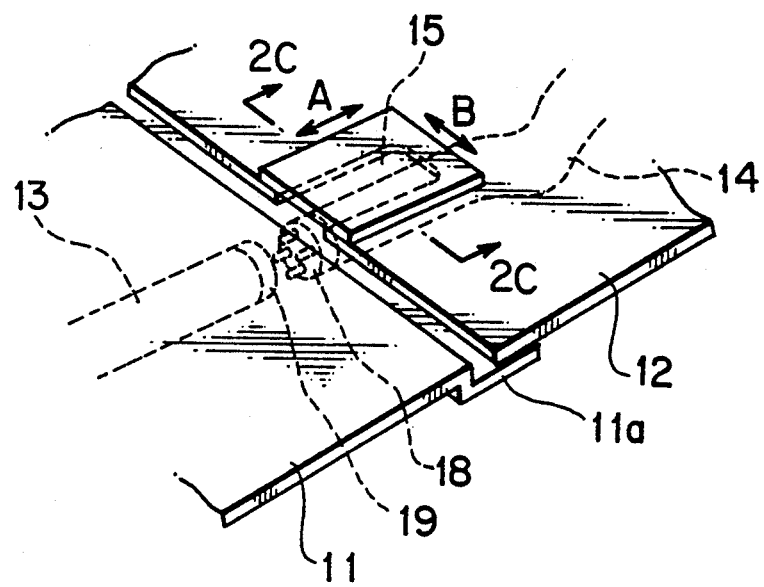
Figure 2B:
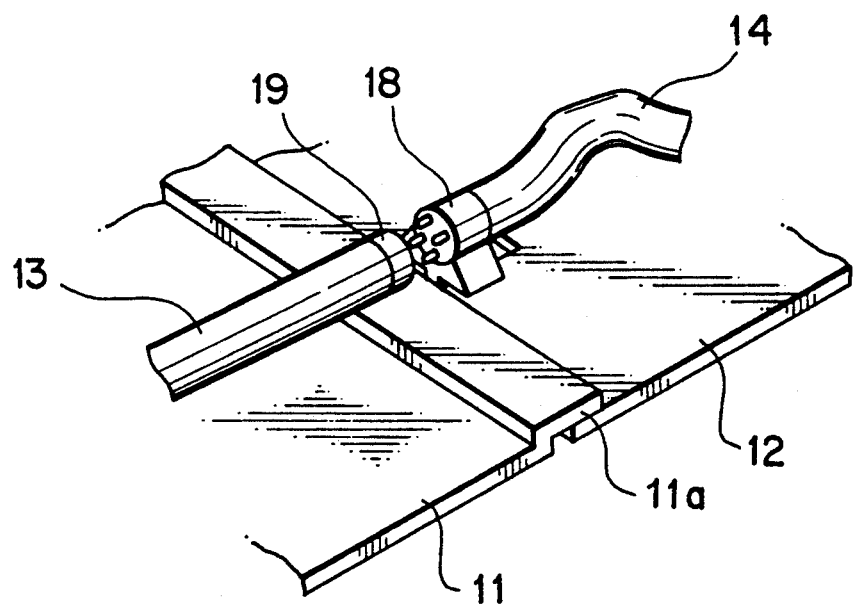
Figure 2C:
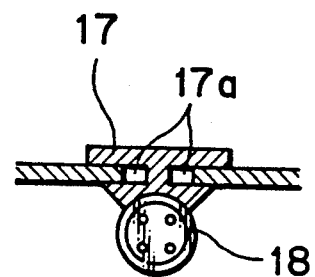

FIGS. 2A to 2C represent a second embodiment of the present invention, wherein a slide groove 17a is formed on the back surface of the lid portion 17 so that the lid portion 17 can be slidably opened or closed in the direction indicated by an arrow A with respect to the aperture 15, and in this case, the movable connector 18 is attached to the movable lid portion 17. Accordingly, if the connector 19 of the unit 11 side is a fixed connector, the connectors 18 and 19 are engaged with each other by simply closing the lid portion 17, and the wire bundles 13 and 14 are thereby connected. Further the lid portion 17 can be so arranged as to slide in the direction indicated by an arrow B as well by constructing the slide groove 17a more deeply for absorbing errors in measurements which can occur between the units 11, 12 and a mounting base on which these units 11 and 12 are to be installed.

Figure 3A:
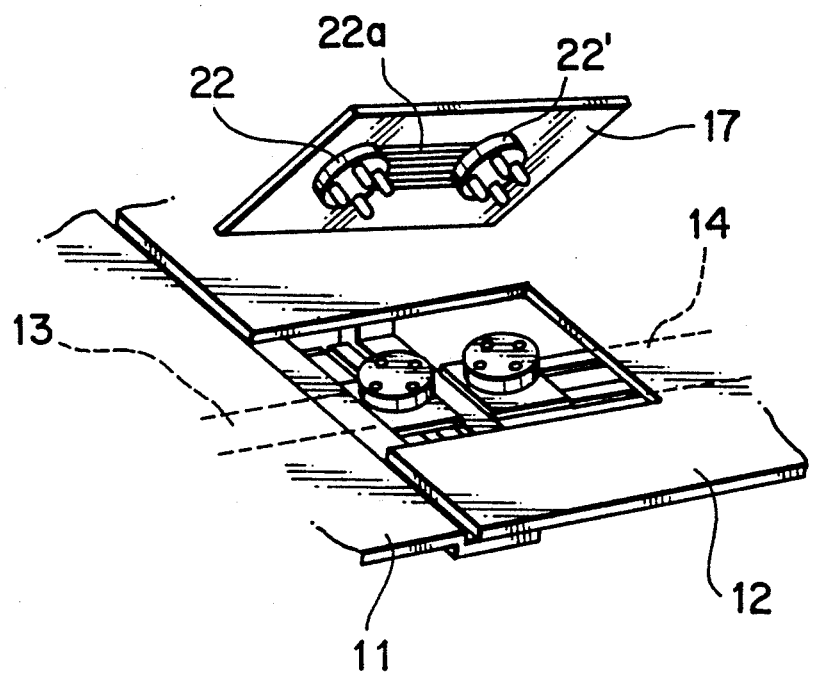
Figure 3B:
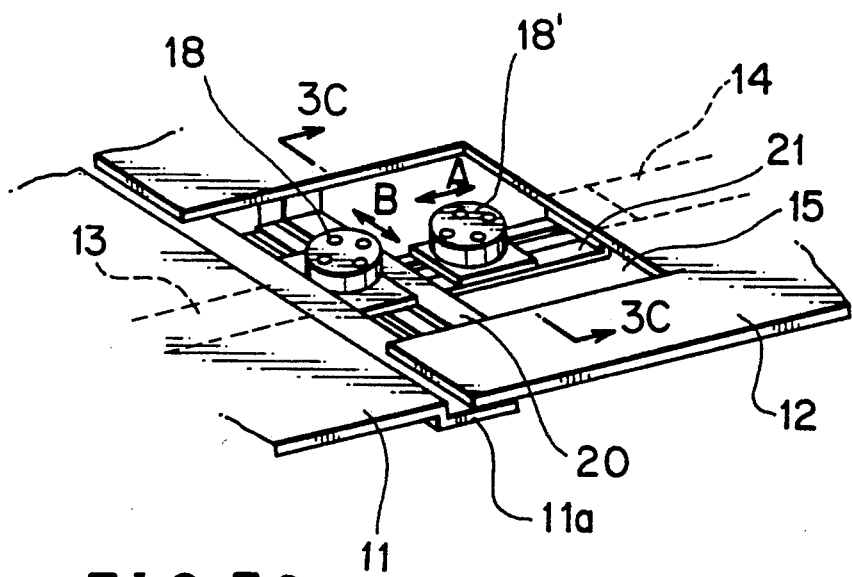
Figure 3C:
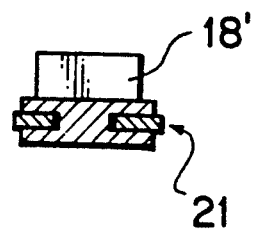

FIGS. 3A to 3C represent a third embodiment of the present invention, wherein the units 11 and 12 adjacent to each other are formed respectively with sliding bases 20 and 21, and on these sliding bases 20 and 21, movable connectors 18 and 18' are slidably mounted respectively. Here, the connector 18 of the unit 11 side is slidable in the direction indicated by an arrow B, and the other connector 18' of the unit 12 side is slidable in the direction indicated by an arrow A, which directions cross each other at right angles.

By the way, the lid portion 17 is formed with short circuiting connectors 22 and 22' which are to be engaged respectively with the movable connectors 18 and 18', wherein a connecting member 22a for electrically connecting these short-circuiting connectors 22 and 22' is further disposed therebetween, whereby the distance between these connectors 22 and 22' is fixed and they are maintained in a short-circuited state.

Since the structure is as such, if the aperture 15 is closed by the lid portion 17 after fixing the units 11 and 12 to the mounting base, then the short circuiting connectors 22 and 22' are engaged respectively with the movable connectors 18 and 18' and thereby connect the wire bundles 13 and 14. In this case, the lid portion 17 is maintained by the engaging force of these connectors, and because of this, fixing means is no longer required. By the way, another alternative arrangement is envisioned such that the short circuiting connectors of the lid portion 17 are disposed as being movable in the directions A and B, and fixed connectors are disposed at the mounting base side, or otherwise, of course, both the connectors on the lid portion and those on the mounting base side can be formed as being movable.

Figure 4A:
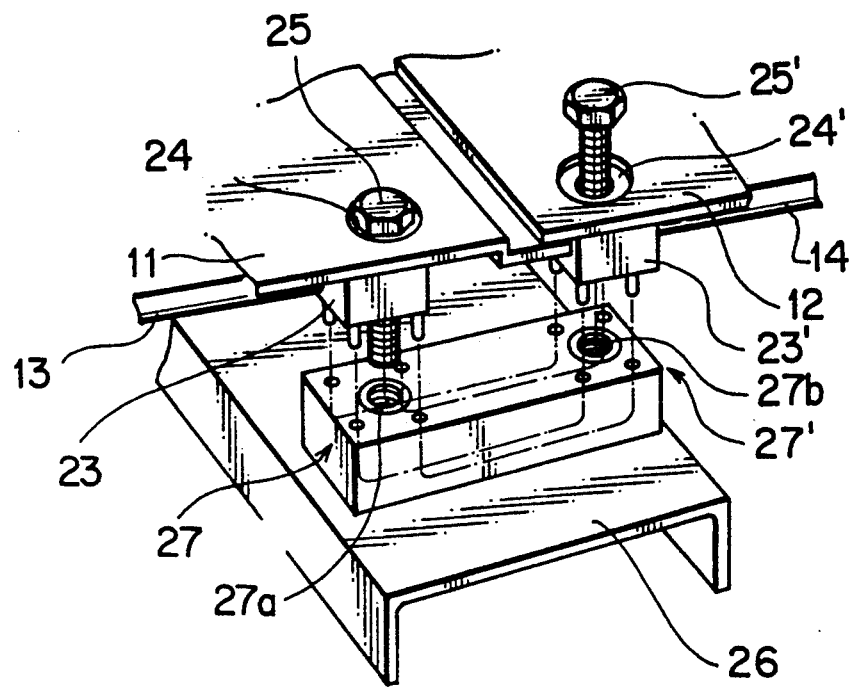
Figure 4B:
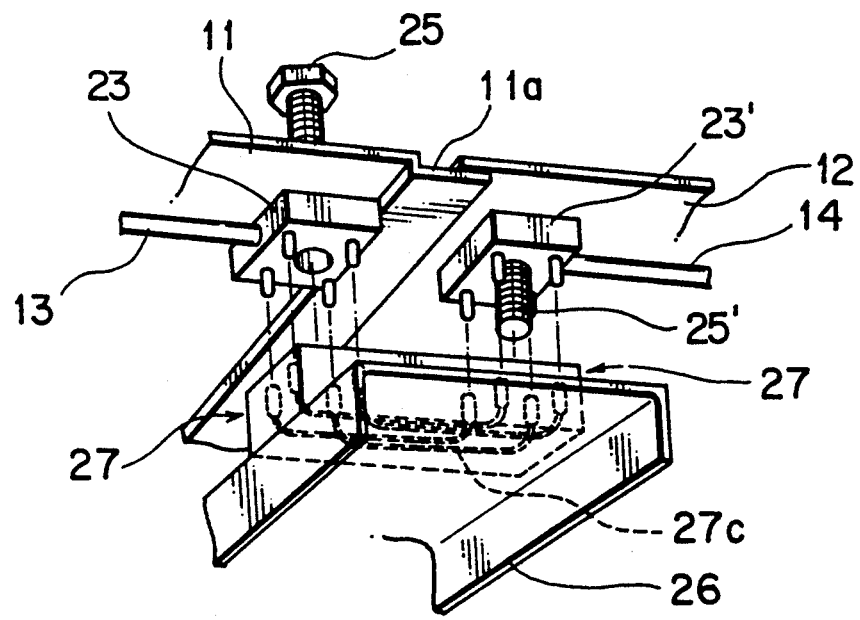
Figure 5:
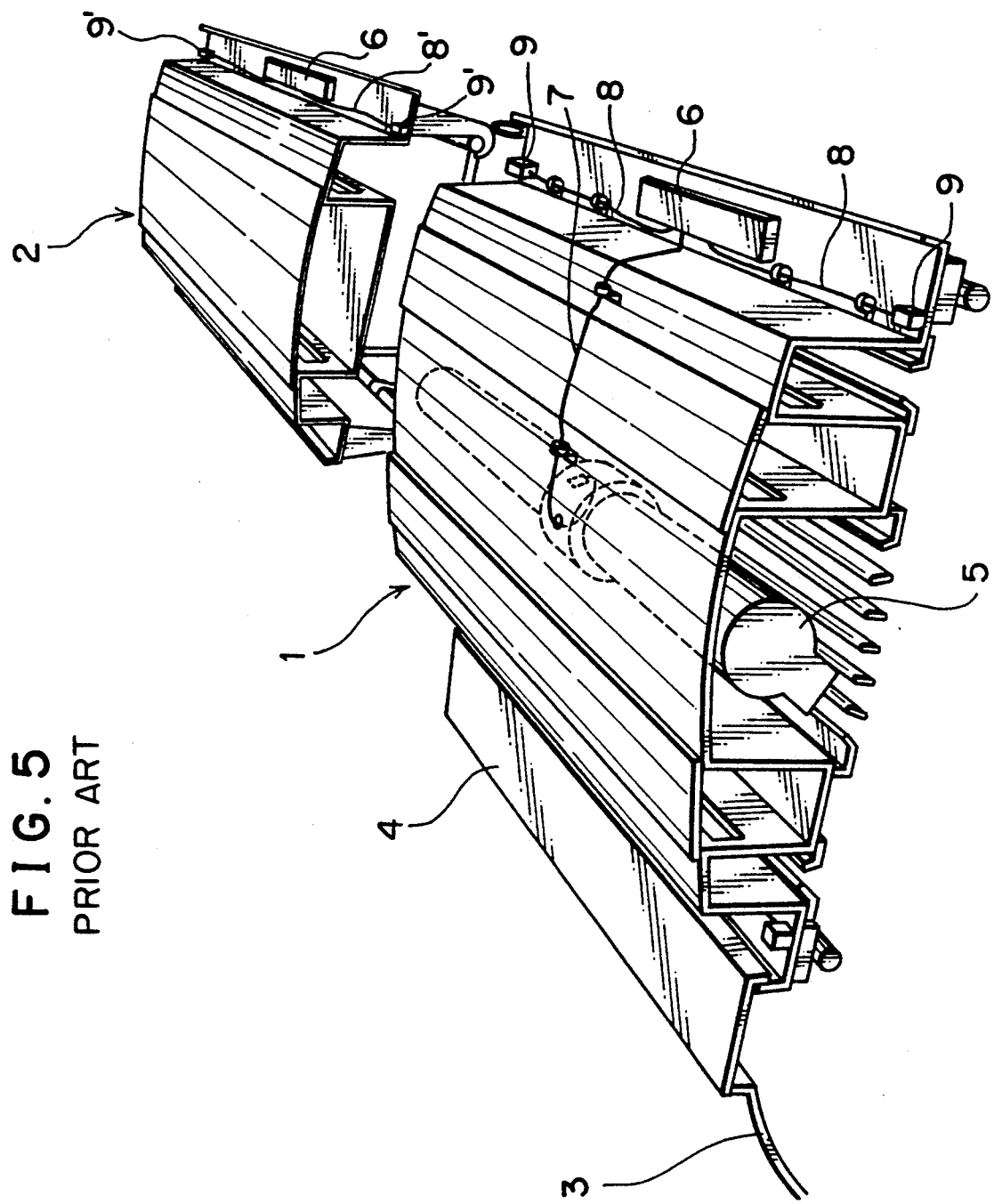
FIG. 5 is a perspective view showing a wiring structure according to the prior art.

FIGS. 4A and 4B represent a fourth embodiment of the present invention, which is characterized in that there is no aperture disposed therein.

Within the vicinity of the junction regions of the respective units 11 and 12, screw-fastening type connectors 23 and 23' are respectively connected to the end portions of the respective wire bundles 13 and 14, and mounting bolts 25 and 25' are inserted through the holes 24 and 24' which penetrate the respective units.

On the other hand, on the mounting base 26 on which the units 11 and 12 are to be installed, short-circuiting connectors 27 and 27' engageable with the connectors 23 and 23' of the respective units 11 and 12 are firmly fixed. The short-circuiting connectors 27 and 27' are formed in an integral shape, wherein these connectors are short-circuited by way of an inner wiring 27c, and female threaded sockets 27a and 27b for respectively receiving the mounting bolts 25 and 25' are formed therein.

In this structure, after placing the unit 12 on the down-step portion 11a of the unit 11 which is adjacent to the unit 12, the connectors 23 and 23' are respectively engaged with the short-circuiting connectors 27 and 27' by way of the mounting bolts 25 and 25', and thereby the units 11 and 12 are fixed onto the vehicle body by way of the mounting base 26 at the same time.

By the way, the above wiring structure is applicable to any one of wall, floor, or ceiling surfaces, and also to various objects such as vehicles other than railway vehicles, buildings and the like.

Effects of the Invention

As described so far, in accordance with the present invention, various electric devices can be installed in advance and wires therebetween can also be previously distributed in each of the units composing interior members of a vehicle, and the unified and distributed wires or wire bundles are easily connected on the back surface of each unit so as to facilitate the wiring operation within each interior unit, whereby a plurality of electric wire distributions can be simultaneously operated, thereby reducing required working periods.

While the invention has been described with reference to specific embodiments, the description is illustrative and is not to be construed as limiting the scope of the invention. Various modifications and changes may occur to those skilled in the art without departing from the spirit and scope of the invention as defined by the appended claims. It is therefore to be understood that within the scope of the appended claims, the present invention may be practiced otherwise than as specifically described herein.

What is claimed is:

1. A wiring system for joining two electrical wires, disposed upon a first side of a support surface, to each other, comprising:
   first and second electrical wires disposed upon a first side of a support surface;
   said first and second electrical wires having connector means disposed upon terminal ends of said first and second electrical wires for interconnecting said first and second electrical wires together to each other;
   means for permitting one of said terminal ends of said first and second electrical wires to be movably supported with respect to said first side of said support surface;
   aperture means defined within said support surface at a position at which said connector means of said first and second electrical wires are to be interconnected together to each other so as to provide access to said connector means of said first and second electrical wires from a second side of said support surface and enable manipulation of said electrical connector means disposed upon said movable one of said terminal ends of said first and second electrical wires so as to permit interconnection of said connector means of said terminal ends of said first and second electrical wires; and
   lid means disposed upon said support surface for providing access to said aperture means and said connector means of said first and second electrical wires when said lid means is disposed in an open position, and for sealingly closing said aperture means and covering said interconnected terminal ends of said first and second electrical wires when said lid means is disposed in a closed position.

2. A wiring system as claimed in claim 1, wherein:
   said terminal end portion wire movably supported upon said support surface has a predetermined length which is just sufficient for permitting said connector means of said movably supported electrical wire terminal end portion to engage said connector means of the other one of said electrical wire terminal end portions when said movably supported terminal end portion is moved from a first, slackened position at which said connector means of said movably supported electrical wire terminal end portion is disconnected from said connector means of said other one of said electrical wire terminal end portions, to a second, extended position at which said connector means of said movably supported electrical wire terminal end portion is connected to said connector means of said other one of said electrical wire terminal end portions.

3. A wiring system as claimed in claim 1, wherein:
   said movable connector is attached to said lid means; and
   said lid means is disposed upon said support surface in such a manner as to be slidable in the direction in which said movable connector is movable so as to be engaged with said connector means of the other one of said electrical wire terminal end portions.

4. A wiring system as claimed in claim 3, wherein:
   said lid means is also slidable in a direction which crosses said direction in which said movable connector means is movable so as to be engaged with said connector means of the other one of said electrical wire terminal end portions for absorbing errors in connection with the relative disposition of said first and second electrical wires.

5. A wiring system as set forth in claim 1, wherein:
   said lid means is hingedly mounted upon said support surface so as to be hingedly movable between said open and closed positions.

6. A wiring system for joining two electrical wires, disposed upon a support surface, to each other, comprising:
   first and second electrical wires disposed upon a support surface;
   said first and second electrical wires having connector means disposed upon terminal end portions of said first and second electrical wires;
   short-circuiting connectors disposed upon a mounting base in such a manner that said short-circuiting connectors are electrically connected therebetween and comprise connector means for engaging said connector means of said first and second electrical wires; and fastening means for fastening said support surface to said mounting base and for simultaneously causing electrical engagement of said short-circuiting connectors with said connector means disposed upon said terminal end portions of said first and second electrical wires as said support surface is fastened to said mounting base by said fastening means.

7. A wiring system as set forth in claim 6, wherein:
said fastening means comprises threaded female sockets defined within said mounting base, and threaded male bolts insertable through said support surface for threaded engagement with said threaded sockets of said mounting base; and said connectors of said first and second electrical wires comprise electrical pin connectors, and said short-circuiting connectors of said mounting base comprise electrical pin sockets for receiving said electrical pin connectors.

8. A wiring system for joining two electrical wires, disposed upon a first side of a support surface, to each other, comprising:

first and second electrical wires disposed upon a first side of a support surface, said first and second electrical wires having connector means disposed upon terminal ends of said first and second electrical wires for interconnecting said first and second electrical wires together to each other;

means for permitting one of said terminal ends of said first and second electrical wires to be movably disposed with respect to said first side of said support surface so as to facilitate interconnection and disconnection of said first and second electrical wires with respect to each other;

aperture means defined within said support surface at a position at which said connector means of said first and second electrical wires are to be interconnected together to each other so as to provide access to said connector means of said first and second electrical wires from a second side of said support surface; and lid means fixedly connected to said one of said terminal ends of said first and second electrical wires which is movably disposed with respect to said support surface, and movably disposed upon said second side of said support surface between a first position at which said lid means uncovers said aperture means and simultaneously disconnects said connector means of said first and second electrical wires, and a second position at which said lid means covers said aperture means and simultaneously connects said connectors of said first and second electrical wires.

9. A wiring system as set forth in claim 8, wherein:
said lid means is slidably disposed upon said second side of said support surface.

10. A wiring system as set forth in claim 9, wherein:
said first and second electrical wires define longitudinal, axial extents; and said lid means is slidably disposed upon said second side of said support surface and along two, mutually orthogonal directions, a first one of said directions being aligned with said longitudinal axial extents of said first and second electrical wires so as to achieve said interconnection of said connectors of said first and second electrical wires, and a second one of said directions being transverse to said longitudinal axial extents of said first and second electrical wires so as to achieve proper coaxial alignment of said first and second electrical wires so as to permit said interconnection of said connectors of said first and second electrical wires.

11. A wiring system for joining two electrical wires, disposed upon a first side of a support surface, to each other, comprising:

first and second electrical wires disposed upon a first side of a support surface, said first and second electrical wires having connector means disposed upon terminal end portions of said first and second electrical wires;

aperture means defined within said support surface at a position at which said connector means of said first and second electrical wires are disposed so as to provide access to said connector means of said first and second electrical wires from a second side of said support surface;

lid means removably disposable within said aperture means of said support surface so as to close said aperture means of said support surface and cover said connector means of said first and second electrical wires when said lid means is disposed within said aperture means of said support surface, and to open said aperture means and provide said access to said connector means of said first and second electrical wires when said lid means is removed from said aperture means of said support surface; and short-circuiting connector means disposed upon said lid means and interconnected together for electrically interconnecting and disconnecting said connector means of said first and second electrical wires when said lid means is respectively disposed within said aperture means of said support surface and removed from said aperture means of said support surface.

12. A wiring system as set forth in claim 11, wherein:
said first and second electrical wires define longitudinal, axial extents; and a first one of said connector means of said first and second electrical wires is movable with respect to said first electrical wire in a first axial direction, and a second one of said connector means of said first and second electrical wires is movable with respect to said second electrical wire in a second direction, transverse to said first axial direction, such that said first and second connector means of said first and second electrical wires are adjustably disposable with respect to said short-circuiting connector means of said lid means so as to insure proper electrical interconnection of said first and second connector means of said first and second electrical wires with said short-circuiting connector means of said lid means.

* * * * *